United States Patent [19]

Smith, Jr. et al.

[11] Patent Number: 4,956,560
[45] Date of Patent: Sep. 11, 1990

[54] LIQUID LEVEL DETECTOR SYSTEM WITH FILL-LEVEL SIGNATURE DETECTION

[75] Inventors: Bruce D. Smith, Jr.; Thomas A. Stalnaker, both of West Chester, Pa.

[73] Assignee: The West Company, Phoenixville, Pa.

[21] Appl. No.: 306,795

[22] Filed: Feb. 3, 1989

[51] Int. Cl.$^5$ .............................................. G01N 21/49
[52] U.S. Cl. .................................. 250/577; 250/223 B
[58] Field of Search ........................... 250/577, 223 B; 137/558; 340/619; 73/293; 116/227

[56] References Cited

U.S. PATENT DOCUMENTS 3,827,812  8/1974  Heimann ...................... 250/223 B
3,887,284  6/1975  Gender ........................ 250/223 B Primary Examiner—David C. Nelms
Assistant Examiner—Sherrie Hsia
Attorney, Agent, or Firm—Eugene E. Renz, Jr.

[57] ABSTRACT

An apparatus for checking the fill level of a vial. The apparatus indicates the presence of a vial in a predetermined location. Light is sensed to measuring the amount of light which is able to pass through the vial at that location. A signal is produced which is porportional to the amount of material in said vial.

23 Claims, 3 Drawing Sheets

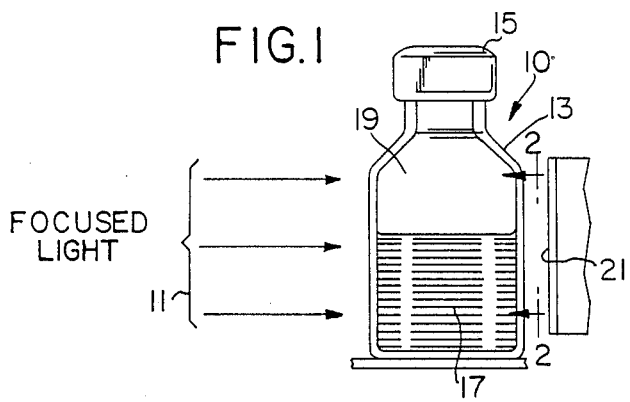
FIG. 1
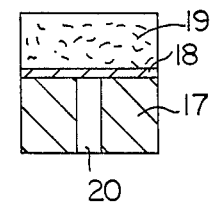
FIG. 2
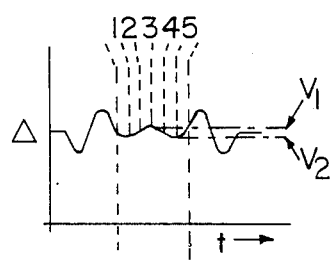
FIG. 3A (EMPTY VIAL)
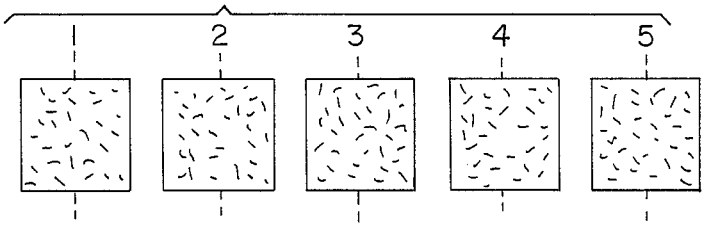
FIG. 4A
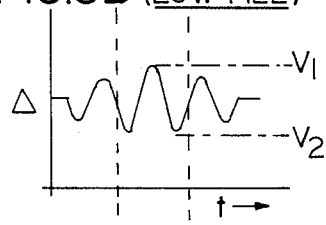
FIG. 3B (LOW FILL)
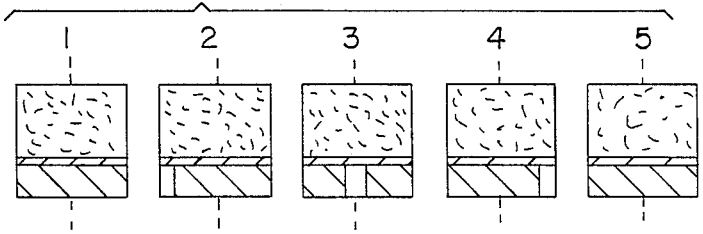
FIG. 4B
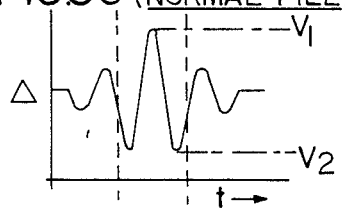
FIG. 3C (NORMAL FILL)
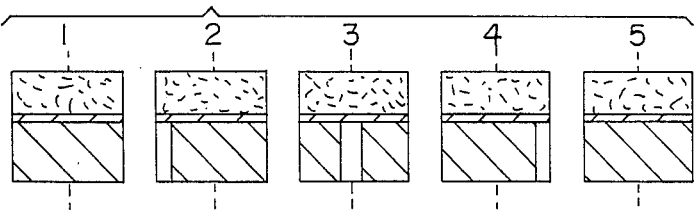
FIG. 4C
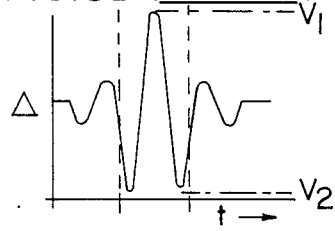
FIG. 3D (HIGH FILL)
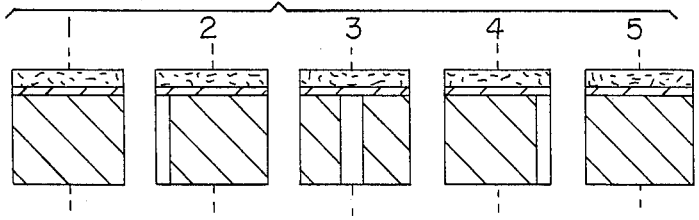
FIG. 4D

LIQUID LEVEL DETECTOR SYSTEM WITH FILL-LEVEL SIGNATURE DETECTION

FIELD OF THE INVENTION

The present invention relates to apparatus, method and system for automatically validating the correct fill level of round, transparent vials or containers.

BACKGROUND OF THE INVENTION

The invention has particular application to pharmaceutical products which are typically packaged in round, rigid glass containers that are usually filled with precise dosages. Accurate fill levels are important to prevent improper application of medicaments.

Such pharmaceutical products are usually packaged by high speed filling and capping equipment. The containers, vials, or bottles are filled with a predetermined volume of medicament at a filling station and thereafter sealed at the closure station.

The fill level is controlled primarily by dispensing medicaments from a reservoir. Dispensing the correct volume of medicament is attained, in most equipment, by a mechanically time-gated method such that medicaments are allowed to flow by gravity from a reservoir through a fill tube into the vial or bottle for a predetermined period of time. For example, for a given medicament, a predetermined volume is made to flow from a reservoir to a bottle by opening and closing a valve between the reservoir and fill tube and is generally controlled by a cam-spring mechanism or a solenoid. It has been found that these gating devices in high-speed, mass production equipment sometimes dispense improper amounts of medicaments because of wear, fatigue, or malfunctions.

Accordingly, it is an object of this invention to provide a unique apparatus, method, and system for electronically checking, in-process, properly and improperly filled, round, transparent vials or containers and for causing the ejection of improperly filled containers.

Another object of the present invention is to provide a means for checking the fill levels of liquids in round, transparent vials or containers.

Another object of the present invention is to provide a means for checking the fill level of solids or powders in round, transparent vials or containers.

Another object of the present invention is to provide an apparatus, method, and system capable of high-speed, uninterrupted operation for one hundred percent fill level checking.

Another object of the present invention is to provide a means of comparing fill levels against predetermined standard fill levels.

Another object of the present invention is to provide a means of automatic rejection of improperly filled containers.

Another objection of the present invention is to provide a means for "teaching" a computer appropriate fill levels for vials or containers.

Another object of the present invention is to provide a means for checking the fill levels of vials and containers of different sizes.

Another object of the present invention is to provide a fill level checker integral with an automatic filling and capping apparatus.

Another object of the present invention is to provide a display of the fill level of each container being checked.

Another object of the present invention is to provide output signals for closing down the fill and checking process if a pre-selected, programmable number of consecutive rejects are detected.

SUMMARY OF THE INVENTION

It has now been discovered that the above and other objects of the present invention can be accomplished in the following manner. Specifically, an apparatus for checking the fill level of a vial has been discovered. The apparatus includes a locating means for indicating the presence of a vial in a predetermined location. Light sensing means for measuring the amount of light are provided for measuring the amount of light being passed through the vial at the location, said means including a signal means for producing a signal which is proportional to the amount of material in the vial. Finally, a response means for receiving that proportional signal and generating a response is provided. The method for checking the fill level of a vial comprises the steps of indicating the presence of a vial in a predetermined location, measuring the amount of light passed through the vial to produce a signal proportional to the amount of material in the vial, and receiving said proportional signal and generating a response.

In both the method and the apparatus, the signal which is generated by the photo detection means is generated after light from a light source is passed through a lens which focuses the light on a remote sensing means such as a photo diode. The photo diode, and accompanying amplifiers, produce a signal which is a waveform of the total energy transmitted through the vial. This waveform has a minimum and maximum sensor output value which provides a signature for these specific fill level of the vial. Mean are provided for regulating the signal to adjust for variations in both the content of the vial and in ambient light conditions. The system is adjustable so that there is a way to compare the proportional signal from the wave length with a predetermined reference standard. During this comparison, a determination can be made for making a go/no go determination. This is often times done by subtracting the minimum sensor output valve from the maximum sensor output value and comparing that with a predetermined reference standard.

The vial is located in the predetermined position, in a preferred embodiment, by placing a photo emitter and photo sensor in alignment together to be interrupted by an opaque portion of the vial, such as the vial cap, so that interruption of the passage of light between the photo emitter and photo sensor activates detection logic to provide a signal indicating the presence of a vial.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a schematic elevational view showing a stoppered and metal overcap sealed, liquid filled, medicant vial, passing between a focused light source and a photovoltaic sensor.

FIG. 2 is a schematic side elevational view taken along line 2—2 of FIG. 1, illustrating the transmissivity zones, created by the focused light and by refraction of light rays through the liquid medium of an appropriately filled vial to show the image which is impinged upon the photovoltaic sensor.

FIGS. 3A through 3D and 4A through 4D show the characteristic signatures of four fill conditions as the containers moves between a light source and a photovoltaic sensor. The signature is a representation of a full cycle voltage time curve produced by the output of the photovoltaic sensor showing the minimum and maximum output of voltages.

DETAILED DESCRIPTION OF THE PREFERRED EMBODIMENT

Figure 5:
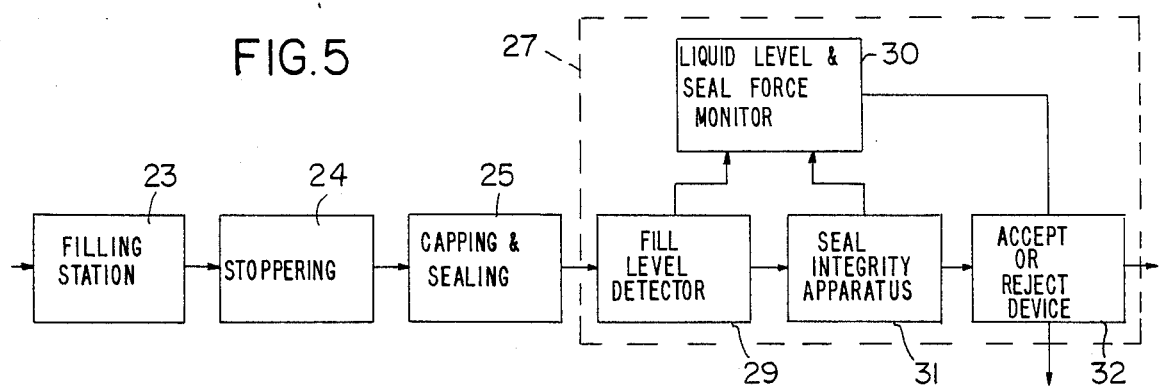
FIG. 5 is a block diagram describing the entire sequence of operations required to automatically and at high speed in a closed sterile environment produce correctly filled and sealed medicant vials, of which the present invention is a part.

The present invention provides an apparatus, system, and method for measuring the amount of fill in a closed container, particularly in those containers which are round and therefore do not need particular orientation during the measuring step. The container must have the ability to transmit at least fifty percent of the visible light to which it is exposed. Similarly, the liquid in the container must have at least a fifty percent transmissivity.

The response of a photovoltaic sensor is directly proportional to the amount of light energy which impinges upon the sensor. As the container filled with liquid passes between the light source and the sensor, the liquid refracts the light rays passing through the liquid to create a focusing effect. The amount of light energy focused on the sensor, for a given source intensity, is a measure of the amount of liquid in the container. The amount of light energy which is transmitted through the container and liquid as the system passes between the light source and the sensor produces a composite time-varying light intensity signature at the output of the sensor. This signature can be compared to a light intensity signature which has been previously obtained from a precisely filled container. When properly calibrated, the present invention can measure the amount of liquid in a container to an accuracy which is acceptable for all pharmaceutical and medical tolerances for variations in prescribed dosage per vial.

A bottle 10 is shown generally in FIG. 1 where focused light from a light source 11 impinges upon the glass bottle 13 which is fitted with a cap 15. The bottle 13 contains a quantity of product 17 and an empty space 19. Under desirable circumstances, precisely the correct amount of contents 17 are within the bottle 13, so that the empty space 19 is also uniform. As the focused light 11 passes through the bottle 13, it is affected by the medium through which it passes. While all of the light passes through the glass 13, only a portion of the light passes through the contents 17, and another portion of the light passes through the empty space 19. This light impinges upon a photovoltaic sensor 21. Since liquids and vacuums or gases absorb light at different rates, the amount of light which passes through the liquid 17 will be different than the amount of light that passes through the unfilled portion 19, so that the light which impinges upon the photovoltaic sensor 21 will vary, depending upon the location of the sensor with respect to the contents.

In FIG. 2, the contents 17 and the empty portion 19 are shown, along with the meniscus 18 of the fluid 17. Because of its nature, the meniscus 18 will give an even lower reading for the amount of light transmitted through it. Also, because the fluid 17 focuses light, the center portion 20 will be brighter than the rest of the fluid.

As shown in FIG. 3A through 3D, four container-liquid fill conditions are depicted as the container-liquid system passes between a light source 11 and a photovoltaic sensor 21. The sensor 21 produces an output signal which is indicative of the total amount of light impinging on the sensor at any given time. These four embodiments in FIG. 3 illustrate the composite signals produced at the sensors output for four fill conditions.

Under ideal circumstances, when the filling and capping apparatus is functioning correctly, a normal fill will be achieved. This is shown in FIG. 3C. As the properly filled container passes between the light source 11 and the photovoltaic sensor 21, a minimum amount of light is transmitted through the container-liquid system representative of the composite transmissivity of the container liquid. Therefore, the amount of liquid in the container will determine the value of $V_2$. However, as the container passes through the system, a focusing effect of the liquid is achieved in the center in which a maximum value of $V_1$ is obtained. Thus with more liquid, the difference between $V_1$ and $V_2$ increases. The empty vial shown in FIG. 3A produces a uniform signal because the empty condition does not allow for a significant variation in the amount of light transmitted as is shown in FIG. 4A and $V_1$ and $V_2$ are not far apart in FIG. 3A.

When there is a low fill, below a predetermined desirable amount, the values for $V_1$ and $V_2$ are separated by a larger amount than the empty vial, but as can be seen in FIG. 4B, the amount of change from a minimum voltage to a maximum caused by the focusing affect is not great when the quantity is not great.

In FIG. 3C and 4C, a normal fill indicates a difference between a minimum value $V_2$ and maximum value $V_1$ which is in response to the amount of liquid contained therein, ranging from the least transmissive state shown in FIG. 4C part 1 to the maximum transmissiveness where the focusing affect is greatest, in FIG. 4C part 3. This "normal fill" signature is reproducible as long as the quantity of liquid remains the same.

Finally, an overfill is shown in FIGS. 3D and 4D, where the minimum transmissiveness $V_2$ due to the overfilled condition is shown. Also, a maximum transmissiveness $V_1$ due to the focusing affect in the center of the vial is shown.

In actual operation, the appropriate values of $V_1$ and $V_2$ are "learned" by a computer system. This is accomplished by repeatedly passing properly filled containers between the light source and the photovoltaic sensor. Once the values for $V_1$ and $V_2$ which are acceptable having been measured repeatedly, allowable deviation limits can be set.

As has been mentioned, this system is designed to measure the amount of material contained in the final product. As shown in FIG. 5, the system generally involves the filling of a container at the filling station 23, a stoppering procedure at the stoppering station 24 and a capping and sealing station 25. At this point, the product should be ready for delivery to the ultimate consumer. However, because machines are not absolutely reliable and because quality control in the pharmaceutical industry is extremely important, the contents are then tested with a system 27 which determines several aspects of the products integrity. Specifically, a fill level detector 29 measures the amount of medicament which has been put into the stoppered container. This information is transmitted to a liquid level monitor 30. Similarly, the seal integrity is tested in a seal integrity apparatus 31. This information is also provided to the liquid level and seal force monitor 30. The monitor 30 then provides an accept or reject signal to the accept or reject device, which in turn allows each individual vial to be accepted or rejected, based upon its fill level and seal integrity.

Figure 6:
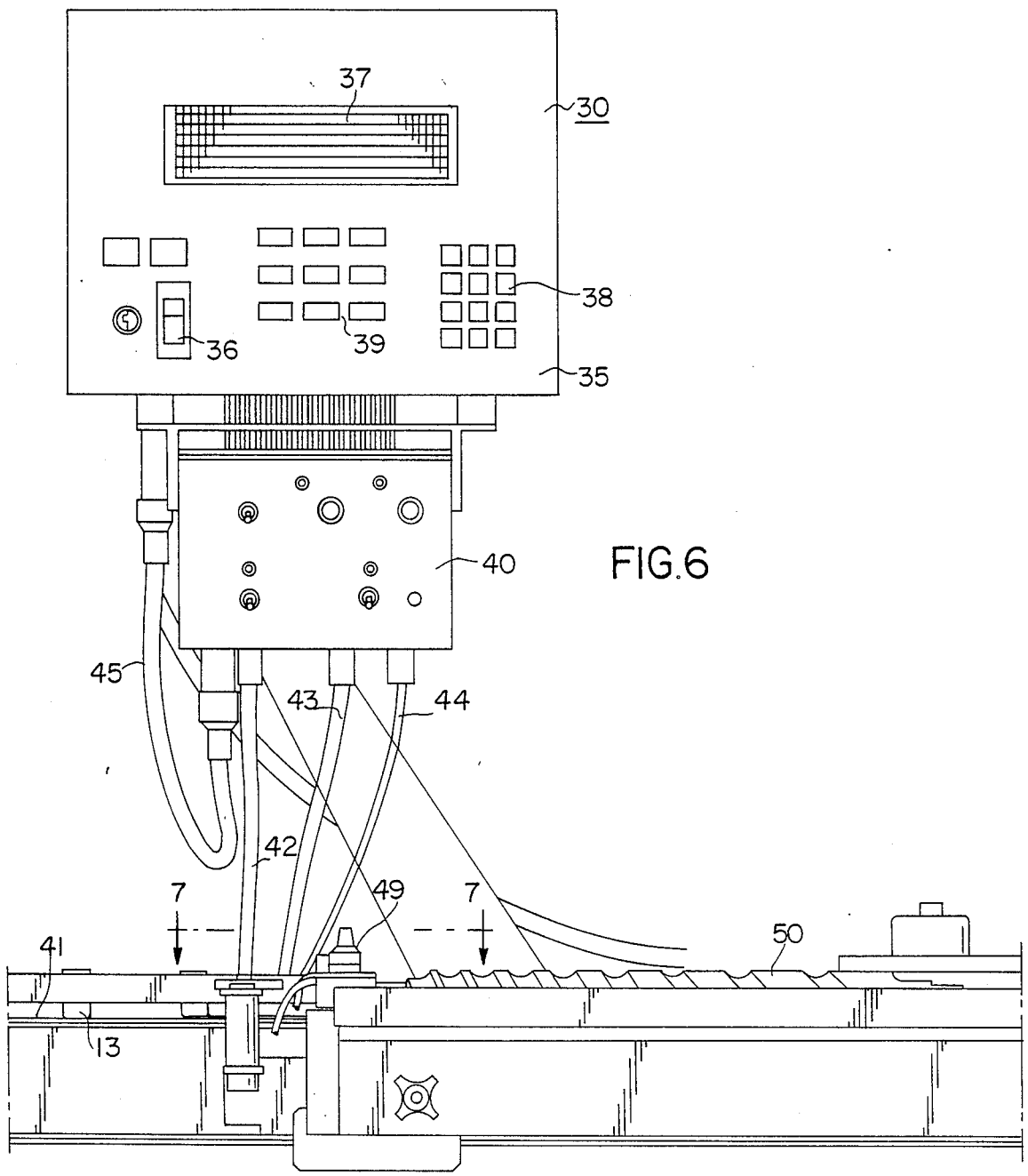
FIG. 6 is a fragmentary front elevation view of the physical elements of this invention.

As shown in FIG. 6, the liquid level and seal force monitor 30 includes a control panel 35, a power switch 36, and a display screen 37. Screen 37 will show the values for $V_1$ and $V_2$ as shown in FIGS. 3A through 3D. Data input keyboard 38 and function selection 39 provide controls for the control panel 35.

In the operation of the present invention, the power and optical source is contained in a processing unit 40. Bottles are transferred to the system on a conveyor 41 and a signal is transmitted through fiber optic wires 42 and 43 to indicate the presence of a vial. The signal is transmitted to the processing unit 40 through a wire 44. The results of the signal processing are then transmitted through a wire 45 to the control panel 35.

Figure 7:
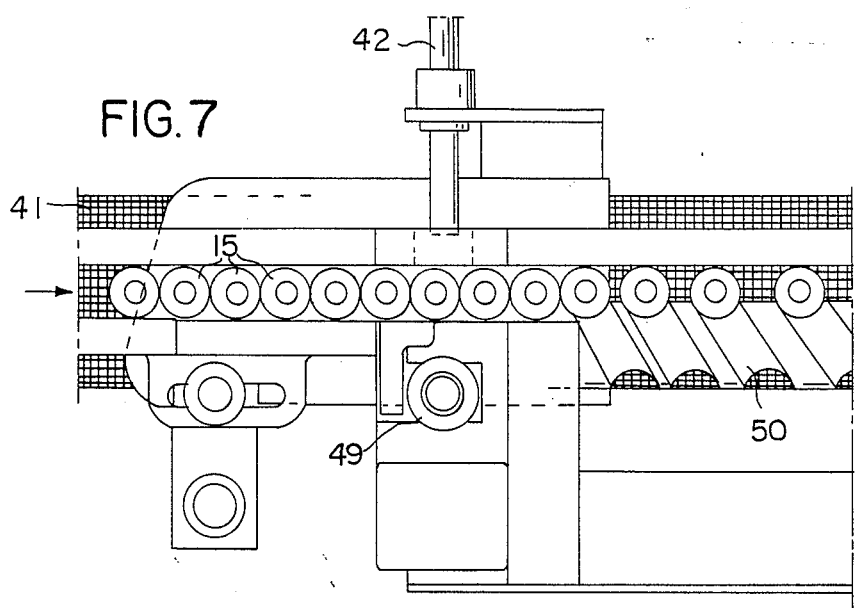
FIG. 7 is an enlarged fragmentary plan view taken along the line 7,7 of FIG. 6.

As shown in FIG. 7, the bottles 15 are transmitted along conveyor 41 until the vial 15 is located between the fiber optic light source 42 and the photo sensor 49. After the measurement has been completed, the bottles are withdrawn on conveyor 41 by means of a spacing screw or accelerating device 50.

Figure 8:
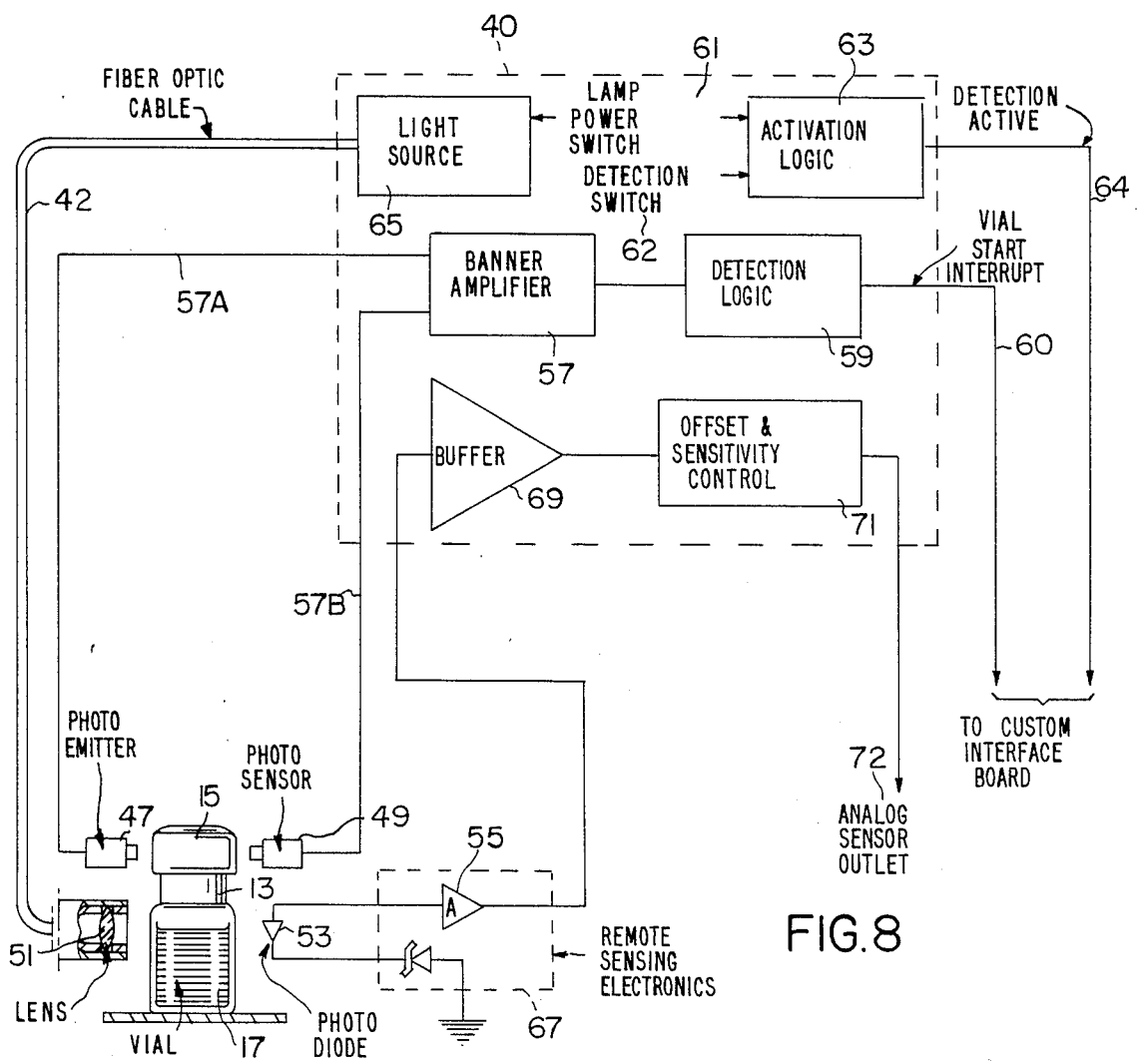
FIG. 8 is a block diagram of the electronics associated with the fill level detection portion of the system.

As shown in FIG. 8, the processing unit 40 provides a light source 65 when the lamp power switch 61 is turned on. Light from a light source 65 is transmitted through the fiber optic cable 42. Similarly, the detection switch 62 activates the logic system in the activation logic box 63, so that a signal indicating that the system is detection active is sent through wire 64 to a processing unit.

The system is activated when the detection switch 62 is turned on to activate the activation logic 63. The activation logic 63 supplies the detection active output 64 with a low signal indicating to the control computer that a detection system is ready for operation. The detection active signal 64 will go on low output only when both the lamp power switch 61 and the detection switch 62 are in the on position. A display light may be provided whenever the detection active output is on low.

After the system is activated, the detection process may begin. A banner amplifier 57 performs a dual function. The banner amplifier 57 supplies the proper output voltage for the photo emitter 47 via line 57A and it receives and amplifies the output signal from the photo sensor 49 via line 57B.

When a vial is not present in the detection system, the light path between the photo emitter 47 and the photo sensor 49 is uninterrupted. The banner amplifier 57 supplies a constant voltage output of approximately 5 volts to the detection logic 59. The detection logic 59 converts the constant voltage level from the banner amplifier 57 to a digital logic level of either 1 or 0. Without a vial present, the detection logic 59 drives the vial start interrupt line 60 with a high or plus 5 voltage. This informs the control computer that no vial is present and the fill measurement process should not take place. The vial start interrupt signal 60, when it is present, allows the control computer to perform other tasks while waiting for a vial to be measured.

Once a vial is placed in the fill level detection system, the light path between the photo emitter 47 and the photo sensor 49 is interrupted by an opaque vial cap 15. The banner amplifier 57 output swings to 0 voltage and remains there until the vial is removed. Once again the detection logic 59 converts the banner amplifier 57 output to a digital logic level. This time, the vial start interrupt line 60 is driven low (0 volts) by the detection logic 59. A low signal interrupts the control computer indicating that the fill level in the vial is ready to be measured. A red LED light may be used to signal that the interrupt signal is now on a low voltage.

The fill level of the vial is now measured. The light produced by the lamp in the light source 65 is transmitted over fiber optic cable 42 and is focused by a lens 51 which is located directly next to the vial 13. A photo diode 53 is located on the other side of the vial 13 with the remote sensing electronics 67. This remote sensing electronics 67 is adapted to bias the photo diode 53, so as to provide a constant input voltage for the photo diode to operate. The output voltage of the photo diode 53 is dependent upon the amount of incident light and is proportional to the amount of light transmitted through the vial 13, which in turn depends upon the amount and type of liquid 17 in the vial. An amplifier 55 is located in the remote sensing electronics 67 and is used to boost the output voltage of the photo diode 53 to make the system less susceptible to errors due to noise interference.

The buffer amplifier 69 is a high impedance device with a phase gain, and it is used to sense only voltage changes from the remote sensing electronics 67. The offset and sensitivity control system 71 assures a linear measuring process even though outside parameters such as ambient light may change. For example, if the fill detection system was required to measure the level of vials containing liquids with different light transmission characteristics, the offset and sensitivity control unit 71 can be adjusted to compensate for the different types of liquid. If the ambient light surrounding the fill level detection system were to change, the sensitivity controls also can be adjusted. Therefore, the measuring process becomes independent of such variables.

As the signal leaves the buffer amplifier 69 and passes through the offset and sensitivity control 71, an output is provided to the analog sensor output 72. This output is proportional to the amount of liquid in the vial. The analog voltage level 72 is then converted to a digital number which represents the amount of liquid in the vial.

Once the vial is removed, the vial start interrupt line 60 is driven high by the transmission of light between the photo emitter 47 and the photo sensor 49 as previously described. The process is then ready to be repeated as soon as the next vial is moved into the predetermined location. As has been previously been mentioned, the appropriate fill level is learned by the computer by passing precisely filled containers between the lens 51 and the photo diode 53. Any adjustment to the light lens photovoltaic sensor alignment is made by a vernier adjustment. Similarly, all electronic components associated with checking the fill level are calibrated and adjusted so that a normal composite transmissivity wave form is produced. This composite transmissivity wave form is stored in the computer memory. The function of the computer is then to compare the actual data being produced during operation of the system with this composition wave form which has been stored in the memory. When the variation between the actual value and the stored composite value are not outside of predetermined limits, the system will indicate that an appropriate fill level has been achieved. Depending upon the need for accuracy, the actual values may deviate by a predetermined acceptable value.

The entire process of notifying the computer that a vial is present, measuring the amount of liquid in the vial and determining whether to accept or reject that vial when compared to a standard quantity can take place in remarkably short periods of time. Only a few milliseconds are needed to operate the system and virtually no time is lost in performing this operation. The system is intended to be part of an overall production system so that it can function during the manufacture and filling of precise quantities of materials in glass containers or vials. It is highly effective in eliminating those products which for some reason do not receive the precise quantity which is desired. Operation of this system will provide even greater safety and reliability to industries such as the medical, pharmaceutical, and veterinary industries where accuracy of dosage is of prime important.

The computer processing the data can be programmed to close down the system if a rejection rate above a predetermined level has been exceeded. For example, 3 or 4 rejects in a row would indicate a malfunction which should be corrected before continuing operations of the system rather than produce a large quantity of rejects.

What is claimed is:

1. Apparatus for checking the fill level of a vial, comprising:
    locating means for indicating the presence of a vial in a predetermined location;
    light sensing means for measuring the amount of light being passed through said vial at said location including a light source, a lens for focusing said light and remote sensing means including a photo diode for receiving said focused light and an amplifier to produce a signal from said diode proportional to the amount of material in said vial;
    said signal being a wave form of the energy transmitted through said vial from said light source and having a minimum and maximum sensor output value which provides a signature for the specific fill level of said vial; and
    response means for receiving said proportional signal and generating a response.

2. The apparatus of claim 1, wherein said locating means includes photo detection means aligned to detect the interruption of light caused by the presence of said vial in said predetermined location.

3. The apparatus of claim 2, wherein said photo detection means includes a photo emitter and a photo sensor aligned together to be interrupted by an opaque portion of said vial when said vial is in said location, and said means further includes detection logic means for providing a signal upon said interruption.

4. The apparatus of claim 1, wherein said response means includes means for comparing the proportional signal to a predetermined reference standard.

5. The apparatus of claim 4, wherein said response means further includes determination means for making a go/no-go determination based upon said comparison.

6. Apparatus for checking the fill level of a vial, comprising:
    locating means for indicating the presence of a vial in a predetermined location, including photo detection means aligned to detect the interruption of light caused by the presence of said vial in said predetermined location;
    light sensing means for measuring the amount of light passed through said vial at said location, said means including signal means for producing a signal proportional to the amount of material in said vial, said light sensing means including a light source, a lens for focusing said light and remote sensing means including a photo diode for receiving said focused light, and further including an amplifier to produce a signal from said diode, said signal being a waveform of the energy transmitted through said vial, said waveform having a minimum and maximum sensor output value which provides a signature for the specific fill level of said vial; and
    response means for receiving said proportional signal and generated a response.

7. The apparatus of claim 6, wherein said photo detection means includes a photo emitter and a photo sensor aligned together to be interrupted by an opaque portion of said vial when said vial is in said location, and said means further includes detection logic means for providing a signal upon said interruption.

8. The apparatus of claim 6 which further includes means for regulating said signal to adjust for variations in contents of said vial and variations in ambient light conditions.

9. The apparatus of claim 6, wherein said response means includes means for comparing the proportional signal to a predetermined reference standard.

10. The apparatus of claim 9, wherein said response means further includes determination means for making a go/no-go determination based upon said comparison.

11. Apparatus for checking the fill level of a vial, comprising:
    locating means for indicating the presence of a vial in a predetermined location;
    light sensing means for measuring the amount of light being passed through said vial at said location including a light source, a lens for focusing said light and remote sensing means including a photo diode for receiving said focused light and an amplifier to produce a signal from said diode proportional to the amount of material in said vial;
    said signal being a wave form of the energy transmitted through said vial from said light source and having a minimum and maximum sensor output value which provides a signature for the specific fill level of said vial;
    response means for receiving said proportional signal and generating a response; and
    means for regulating said signal to adjust for variations in contents of said vial and variations in ambient light conditions.

12. Apparatus for checking the fill level of a vial, comprising:
    locating means for indicating the presence of a vial in a predetermined location;
    light sensing means for measuring the amount of light passing through said vial at said location, said means including signal means for producing a signal proportional to the amount of material in said vial, said light sensing means including a light source, a lens for focusing said light and remote sensing means including a photo diode for receiving said focused light, and further including an amplifier to produce a signal from said diode; and response means for receiving said proportional signal and generating a response;

said signal being a waveform of the energy transmitted from said light source through said vial, said waveform having a minimum and maximum sensor output valve which provides a signature for the specific fill level of said vial.

13. Apparatus for checking the fill level of a vial, comprising:

locating means for indicating the presence of a vial in a predetermined location;

light sensing means for measuring the amount of light passing through said vial at said location, said means including signal means for producing a signal proportional to the amount of material in said vial, said light sensing means including a light source, a lens for focusing said light and remote sensing means including a photo diode for receiving said focused light, and further including an amplifier to produce a signal from said diode;

response means for receiving said proportional signal and generating a response; and means for regulating said signal to adjust for variations in contents of said vial and variations in ambient light conditions.

14. A method for checking the fill level of a vial, comprising the steps of:

indicating the presence of a vial in a predetermined location;

measuring the amount of light passed through said vial to thereby produce a signal proportional to the amount of material in said vial; and receiving said proportional signal and generated a response;

the light being focused from a light source by a lens on a photo diode to produce a signal from said diode, said signal being a waveform of the energy transmitted through said vial, said waveform having a minimum and maximum sensor output value which provides a signature for the specific fill level of said vial.

15. The method of claim 14, which further includes the step of detecting the interruption of light caused by the presence of said vial in said predetermined location.

16. The method of claim 15, in which an opaque portion of said vial interrupts a photo emitter and a photo sensor when said vial is in said location to provide a signal upon said interruption.

17. The method of claim 14 which further includes regulating said signal to adjust for variations in contents of said vial and variations in ambient light conditions.

18. The method of claim 14, which further includes comparing the proportional signal to a predetermined reference standard.

19. The method of claim 18, which further includes making a go/no-go determination based upon said comparison.

20. A method for checking the fill level of a vial, comprising the steps of:

indicating the presence of a vial in a predetermined location by detecting the interruption of light caused by the presence of said vial in said predetermined location;

measuring the amount of light which is passed through said vial to thereby produce a signal proportional to the amount of liquid in said vial, wherein light is focused from a light source by a lens on a photo diode to produce a signal from said diode wherein said signal is a waveform of the energy transmitted through said vial, said waveform having a minimum and maximum sensor output value which provides a signature for the specific fill level of said vial; and receiving said proportional signal and generated a response by comparing the proportional signal to a predetermined standard.

21. The method of claim 20, in which an opaque portion of said vial interrupts a photo emitter and a photo sensor when said vial is in said location to provide a signal upon said interruption.

22. The method of claim 20 which further includes regulating said signal to adjust for variations in contents of said vial and variations in ambient light conditions.

23. The method of claim 20, which further includes making a go/no-go determination based upon said comparison.

* * * * *